(12) United States Patent  
Daniel (10) Patent No.: US 7,705,269 B2
(45) Date of Patent: Apr. 27, 2010

(54) METHOD AND APPARATUS FOR ADVANCE WARNING AND CONTROLLED SHUTDOWN IN AN ARC PROCESSING SYSTEM

(75) Inventor: Joseph A. Daniel, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1214 days.

(21) Appl. No.: 11/081,060

(22) Filed: Mar. 15, 2005

(65) Prior Publication Data

US 2006/0207979 A1   Sep. 21, 2006

(51) Int. Cl.
B23K 9/10 (2006.01)

(52) U.S. Cl. .................. 219/130.21; 219/130.01; 219/137 PS; 219/137 R; 700/212

(58) Field of Classification Search ............ 219/130.01, 219/137 PS, 137 R, 130.21; 700/207, 212
See application file for complete search history.

(56) References Cited

U.S. PATENT DOCUMENTS

| | | | |
|---|---|---|---|
| 2,868,612 A | | 1/1959 | Taylor et al. |
| 4,456,808 A | * | 6/1984 | Wilkinson et al. ............ 219/98 |
| 4,728,934 A | | 3/1988 | Pfander et al. |
| 5,357,076 A | | 10/1994 | Blankenship |
| 5,464,957 A | | 11/1995 | Kidwell et al. |
| 5,504,299 A | * | 4/1996 | Heckendorn ............... 219/109 |
| 5,514,846 A | * | 5/1996 | Cecil et al. ................. 219/110 |
| 5,847,354 A | | 12/1998 | Daniel |
| 6,084,195 A | | 7/2000 | Swaggerty et al. |
| 6,420,680 B1 | | 7/2002 | Samodell |
| 6,570,129 B1 | | 5/2003 | Samodell |
| 6,697,044 B2 | | 2/2004 | Shahoian |
| 6,705,563 B2 | | 3/2004 | Luo et al. |
| 6,708,877 B2 | | 3/2004 | Blankenship et al. |
| 6,759,623 B2 | | 7/2004 | Enyedy |
| 2001/0045420 A1 | * | 11/2001 | Bong et al. ............... 219/125.1 |
| 2004/0099132 A1 | | 5/2004 | Parsons |
| 2004/0251910 A1 | * | 12/2004 | Smith .......................... 324/510 |
| 2005/0077878 A1 | * | 4/2005 | Carrier et al. ................ 320/134 |

OTHER PUBLICATIONS

MeDose Operating Instructions (2 pages).
Welding Procedure Specification AWS A5.5-96 (1 page).

* cited by examiner

*Primary Examiner*—Stephen J Ralis
(74) *Attorney, Agent, or Firm*—Hahn Loeser & Parks LLP (57) ABSTRACT

Warning and shutdown systems and methods are presented for providing advance warnings of pending fault conditions to an operator of an arc processing system. The warning system comprises an input, a logic system, and a signaling system, where the input receives a sensor signal indicative of an operational condition of the arc processing system, the logic system detects a pending fault condition based on the sensor signal, and the signaling system provides a warning signal to the operator, wherein the warning signal is indicative of the pending fault condition. Shutdown apparatus is provided which has a sensor input, a logic system to detect a fault condition, and a shutdown system that selectively shuts the arc processing system down a predetermined time period after fault detection.

42 Claims, 5 Drawing Sheets

METHOD AND APPARATUS FOR ADVANCE WARNING AND CONTROLLED SHUTDOWN IN AN ARC PROCESSING SYSTEM

FIELD OF THE INVENTION

The present invention relates generally to welding and plasma cutting equipment, and more particularly to apparatus and methods for providing advance warnings to an operator of such equipment and controlled shutdown thereof.

INCORPORATION BY REFERENCE

The following patents are hereby incorporated by reference as background information with respect to arc processing systems: Blankenship U.S. Pat. No. 5,357,076; Daniel U.S. Pat. No. 5,847,354; Swaggerty U.S. Pat. No. 6,084,195; Samodell U.S. Pat. No. 6,420,680; Samodell U.S. Pat. No. 6,570,129; Luo U.S. Pat. No. 6,705,563; Blankenship U.S. Pat. No. 6,708,877; and Enyedy U.S. Pat. No. 6,759,623.

BACKGROUND OF THE INVENTION

Arc processing systems include welders and plasma cutters that generate and apply electrical arcs to workpieces in welding or cutting operations. Welders typically include various subsystems and components, such as power sources, motorized wire feeders, shielding gas supplies, etc., which operate in a coordinated fashion to perform a welding operation. During operation, one or more subsystems may experience fault conditions that cause unexpected failure or shutdown of the subsystem. For instance, welding power sources heat up during normal use, particularly during extended operation at high current levels (e.g., high duty cycle operation of switching power supplies for long periods of time). Switching power supplies in particular include power transistors which are prone to overheating, wherein exceeding the thermal budget of welding power sources or electrical components thereof may cause component degradation and/or failure, as well as unexpected shutdown of the power source. Other examples of arc processing system fault conditions include overheated motor windings, short circuit conditions, reduced supply of process shielding gases, reduced coolant performance for fluid cooled torches, or exhaustion of a supply of consumable welding wire.

These conditions are particularly problematic when a subsystem failure or shutdown causes premature termination of a welding or other arc processing operation. For instance, an abrupt shutdown of a welder operating on workpieces traveling along a production line may require stoppage of the line and removal of a workpiece for scrap or rework. In addition, the line may need to be stopped for an extended time to repair or restart the welder once the fault condition has been removed. Even where such fault situations do not lead to catastrophic component failure, these conditions may degrade a subsystem or component of the arc processing system, thereby adversely affecting welder operation and/or reducing the quality of the finished workpieces. Fault conditions in one subsystem, moreover, may adversely affect another subsystem. For example, a welding torch may be damaged if a welding wire supply is exhausted during a welding operation and the power source does not discontinue the output voltage, resulting in damage to the contact tip of the welding torch and possibly failure or rejection of the welded workpiece. In another example, degradation or failure of a fluid-cooled welding torches may occur if the cooling water flow is too low and/or if the coolant temperature is too high.

In order to minimize damage to system components and corruption of welding or cutting operations, conventional arc processing systems often employ one or more sensors or monitoring systems to ascertain the operational condition of system components and/or subsystems. Examples include systems for monitoring welding wire supply levels as presented in Daniel, pending U.S. patent application Ser. No. 10/954,945, filed Sep. 30, 2004, entitled MONITORING DEVICE FOR WELDING WIRE SUPPLY, which is not prior art, the entirety of which is hereby incorporated by reference as background information. When a fault condition is indicated, the system shuts down and may indicate the type of error. In this regard, welding power sources may include thermal sensors such as RTDs, thermocouples, etc. to ascertain the temperature of power switching devices, wherein a system fault may be triggered by a thermocouple signal transitioning above a predetermined value. Samodell U.S. Pat. No. 6,570,129 discloses a protection device for a dual stage power source, and is incorporated by reference as background information. System shutdown may involve the power source stopping current flow and thereby extinguishing the welding arc, after which the operator must wait until the power source cools sufficiently to restart the system. If the welder includes a display, a status message may be provided telling the operator the nature of the fault.

Although this technique can be used to successfully avoid thermal failure of the power source switching components, immediate system shutdown is undesirable because the operator does not know in advance that a fault will occur, and the shutdown may happen in the middle of a weld operation. In this instance, the weld joint being created during the shutdown may be deficient and require repair or rework, or the immediate shutdown may render a workpiece unusable. For example, the fault/shutdown could occur at a critical point of the weld, or a finishing sequence of a multi-step welding operation could be missed, such as a crater fill. In systems without operator displays, an unexpected shutdown could lead the operator to conclude that something is broken, or that the supply voltage to the welder has been discontinued, or the operator may make other false assumptions regarding the cause of the system stoppage. Accordingly, there is a need for improved systems and techniques by which components of arc processing systems can be protected against overload damage and process quality can be maintained, while avoiding system down time and workpiece scrap or rework caused by uncontrolled and/or unanticipated system shutdown.

SUMMARY OF INVENTION

The present invention relates to welders, plasma cutters, and other arc processing systems, wherein warning systems and techniques are employed to provide system operators with advance indications of pending fault conditions. The invention further contemplates shutdown methods and systems by which selective system shutdown may be carried out in a controlled fashion according to detected pending and/or actual fault conditions in an arc processing system, by which the above and other shortcomings of conventional systems may be mitigated or avoided. One or more aspects of the invention are hereinafter summarized so as to facilitate a basic understanding thereof, wherein this summary is not an extensive overview of the invention, and is intended neither to identify key or critical elements of the invention, nor to delineate the scope of the invention. Rather, the primary purpose of the summary is to present some concepts of the invention in a simplified form prior to the more detailed description that is presented hereinafter.

In accordance with one aspect of the invention, a warning system is provided to alert an operator to pending fault conditions in an arc processing system. The warning system includes an input coupled to receive one or more sensor signals indicative of the operational condition of the arc processing system, as well as a logic system to detect a pending fault condition according to the sensor signal or signals. The warning system further provides a pending fault signaling system that selectively provides a warning signal to the operator that indicates the pending fault condition prior to system shutdown. The invention thus allows the operator to proactively decide to take appropriate steps to prevent damage to a welding or cutting operation currently underway, and/or to refrain from starting a new welding or cutting operation, thereby mitigating the likelihood of creating defective welds or otherwise damaging a workpiece. The warning signal may be of any form, such as an audio signal, a visual signal, a tactile signal, a digital communication signal, etc., by which the operator can be alerted to a pending fault in the system. Where multiple system conditions are being sensed, the warning signal may also provide an indication to the operator of the source of the anticipated fault event.

The system may further include a shutdown system or apparatus to shut the arc processing system down, where the shutdown can be a predetermined controlled shutdown sequence to mitigate workpiece or component damage if the operator is attempting to finish a previously started operation. The shutdown system may optionally provide a further operator signal that the shutdown is commencing. In one example, the shutdown system can initiate the shutdown a certain time period following the warning signal. In another possible implementation, the system initiates the warning signal when the sensor signal exceeds a first value and then undertakes shutdown only if the signal exceeds a second threshold, whereby the operator can be alerted to intermittent borderline conditions without unnecessary work stoppage.

In accordance with another aspect of the invention, an apparatus is provided for shutting down an arc processing system, which can be implemented alone or in combination with a pending fault warning system. The shutdown apparatus includes an input for receiving a sensor signal, a logic system that detects a fault condition according to the sensor signal, and a shutdown system operatively coupled to selectively shut the arc processing system down a predetermined time period after a fault condition is detected, wherein the apparatus may detect and act upon pending and/or actual fault conditions. In a related aspect of the invention, the shutdown system may be operable to selectively prevent a new welding cycle from being started after fault detection if the predetermined time period will expire before the prospective new welding cycle will complete, thereby preventing creation of avoidable incomplete welds and associated scrap and rework.

Yet another aspect of the invention provides a method of indicating a pending fault condition to an operator of an arc processing system. The method comprises monitoring a sensor signal indicative of an operational condition of the arc processing system, detecting a pending fault condition according to the sensor signal, and providing a warning signal to the operator to indicate the pending fault. The method may further comprise detecting an actual fault condition according to the sensor signal, and shutting down the system accordingly, wherein the system may be shut down according to a controlled shutdown sequence which may be initiated a predetermined time period after the warning signal is provided to the operator.

In accordance with still another aspect of the invention, a method is provided for shutting down an arc processing system. The method includes monitoring a sensor signal, detecting a fault condition, such as an actual or pending fault, and selectively shutting down the arc processing system a predetermined time period after fault detection. The method may further include determining whether a new welding cycle can be completed before expiration of the predetermined time period, and selectively preventing the new welding cycle from starting if the predetermined time period will expire before the new welding cycle would complete.

BRIEF DESCRIPTION OF THE DRAWINGS

The following description and drawings set forth in detail certain illustrative implementations of the invention. These are indicative of but a few of the various ways in which the principles of the invention may be employed. Other objects, advantages and novel features of the invention will become apparent from the following detailed description of the invention when considered in conjunction with the drawings, in which.

DETAILED DESCRIPTION OF THE INVENTION

One or more embodiments or implementations of the present invention will now be described with reference to the drawings, wherein like reference numerals are used to refer to like elements throughout and wherein the illustrated structures are not necessarily drawn to scale. Apparatus and methodologies are provided for giving an operator advance warning of anticipated fault conditions prior to system shutdown, as well as for controlled shutdown of the system after fault detection. Although illustrated and described hereinafter in the context of an arc welding system, the invention finds utility in association with any system that generates and maintains arcs for operating on a workpiece or structure, including welders, plasma cutters, and other arc processing systems. The invention may be implemented for warning an operator of, and/or performing system shutdown based on, any type of detectable pending or actual faults, and finds particular utility with respect to non-time critical fault conditions, such as power source thermal overload, wire feeder motor overload or overheating, low coolant flow rate and coolant over-temperature conditions for fluid-cooled torches, low shielding gas pressure, and low welding wire supply levels.

Figure 1:
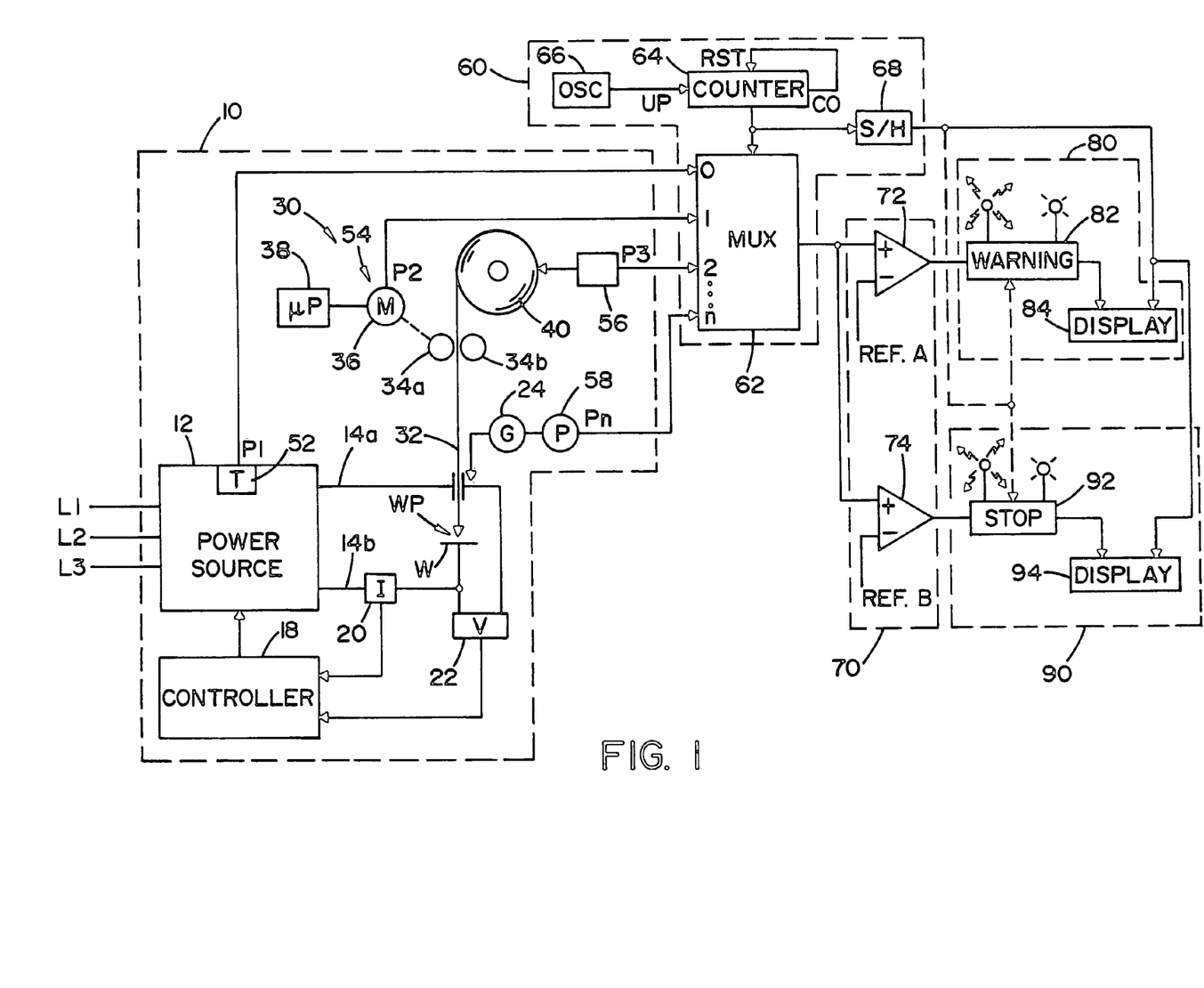
FIG. 1 is a simplified schematic view illustrating an arc welder with an exemplary warning system in accordance with the present invention.

Referring initially to FIG. 1, various aspects of the invention are illustrated in conjunction with a welder arc processing system 10 which is operable to perform a welding process or operation WP on a work piece W. Welder 10 includes a power source 12 with output leads 14*a* and 14*b*, where power source 12 converts three phase electrical power from lines L1, L2, L3 into welding current and voltage waveforms at leads 14a and 14b to create and maintain a controllable welding arc for performing a welding operation WP on the work piece W. A controller 18 is coupled to power source 12 and provides a control signal thereto based on welding process feedback from a current sensor (e.g., shunt) 20 and/or from a voltage sensor 22. Welder 10 further includes a process gas supply 24 for providing shielding gas to the welding process WP, as well as an automatic wire feeder 30. Wire feeder 30 provides a consumable welding wire (welding electrode) 32 to the process WP in a controlled fashion using rollers 34a and 34b, at least one of which is driven by an electric motor 36. Motor 36 and rollers 34 direct the welding wire 32 toward process WP in a controlled fashion from a consumable welding wire supply 40 in accordance with control signals from a microprocessor 38, where controller 18 and microprocessor 38 are interconnected for coordinated operation of power source 12 and wire feeder 30. The provision of process gas from the source 24 and/or the provision of welding wire 32 to the process WP by the wire feeder 30 may be independently controlled or may be carried out under direction of appropriate control signals from controller 18.

In accordance with an aspect of the invention; various component or subsystem sensors are operatively coupled to welder 10 so as to sense various conditions of the arc processing system 10. In the example of FIG. 1, power source 12 includes a thermal sensor 52, such as an RTD, thermocouple, etc., which senses a temperature associated with one or more components of power source 12, and which provides a corresponding sensor signal or parameter P1 that represents the temperature of one or more power switching elements in the power source 12 (e.g., bipolar power transistors, MOSFET devices, IGBTs, etc.). With respect to thermal overload of power source 12, the sensor signal P1 from thermal sensor 52 and the value thereof provide an indication of the operational condition of power source 12. Likewise, welder 10 further includes a thermal sensor 54 associated with wire feeder motor 36, which provides a sensor signal P2 indicating the temperature of the wire feeder motor windings. A wire supply level sensor 56 is also provided to detect the remaining supply of welding wire 32, where level sensor 56 provides a remaining supply sensor signal P3. In addition, a gas pressure sensor 58 is provided which generates a gas pressure sensor signal Pn representing the pressure and/or flow rate of the process gas 24 supplied to the welding process WP.

The present invention provides a warning system for alerting an operator to pending fault conditions in welder 10, as well as shutdown apparatus for intelligent system shutdown, wherein the exemplary system of FIG. 1 exemplifies both these aspects of the invention. It is noted that other implementations are possible, wherein one or both these aspects of the invention are implemented separately or in combination. The illustrated warning system comprises an input 60 coupled with the welding system sensors 52, 54, 56, and 58 to receive corresponding sensor signals P1, P2, P3, . . . , Pn. The warning system further includes a logic system 70 operatively coupled with input 60 to detect pending fault conditions according to one or more of the sensor signals P1-Pn. In addition, a pending fault signaling system 80 is coupled with logic system 70 and with input 60 to selectively provide a warning signal, thereby alerting a welding system operator to the pending fault condition.

Any number of system sensors may be coupled to the input 60 within the scope of the invention. In the illustrated example, input 60 receives 4 sensor signals P1-Pn by way of a multiplexer 62, wherein the multiplexer inputs receive the sensor signals P1-Pn and provide a single output to logic system 70 according to a selected multiplexer channel. Channel selection for multiplexer 62 is provided by a binary counter 64 having an increment or UP input driven by an oscillator or clock 66 and a carry output CO driving a reset input RST of counter 64, whereby a binary output of counter 64 provides for sequential selection of sensor signals P1-Pn such the multiplexer output represents a sequence of welder operational parameters or signal values from sensors 52-58. Input 60 further includes a sample/hold circuit 68 coupled to the output of counter 64 so as to provide a sensor identifier (channel selection information) to pending fault signaling system 80 and to a shutdown system 90. In this manner, when logic system 70 detects a pending fault condition associated with a currently selected sensor 52-58 (selected input channel of multiplexer 62), signaling system 80 can selectively provide a particular warning signal to the operator according to the sensor identifier information from input 60. This allows different operator discernable warning signals to be provided by signaling system 80 depending on which sensed operational system parameter is approaching a fault condition. As a result, an operator may be apprised of the source of a pending fault, and make an informed decision on any appropriate action to be taken, such as manually shutting down welder 10, finishing a current welding cycle and refraining from beginning the next cycle, etc. In addition, as illustrated and described below with respect to FIGS. 9 and 10, the multiplexer channel selection information may be employed in automated shutdown apparatus of the invention, to selectively allow or prevent starting of a new welding cycle after detection of a pending or actual fault condition.

The illustrated logic system 70 includes first and second comparators 72 and 74, respectively, where the first comparator 72 compares the output of multiplexer 62 with a first reference or threshold signal REF. A to ascertain whether a pending fault condition is present. This reference REF. A in one possible implementation may be a first voltage that is less than a corresponding sensor voltage at which an actual process or system fault occurs. Thus, when the value of a selected system sensor exceeds the value of REF. A, comparator 72 provides a pending fault output signal to signaling system 80. Signaling system 80, in turn, provides a warning signal to the operator of welder 10. System 80 includes a signaling device 82, which can be any suitable apparatus that operates to provide a discernable signal or message to an operator of welder 10, including but not limited to audio signals, visual signals, tactile signals, and digital communication signals. System 80 may further include a visual display or user interface 84, in which case display 84 is operable to selectively indicate the source of the pending fault condition according to the selected signal channel (sensor identifier information) from sample/hold 68 of input 60 as the warning signal is issued. In one possible alternative implementation, several reference values REF. A may be provided to the negative input of comparator 72 via a second multiplexer (not shown) coupled to the counter 64, whereby individual first reference values REF. A can be provided for each of the sensed system parameters P1-Pn, allowing individually adjustable pending fault thresholds.

In accordance with another aspect of the invention, the warning system further comprises a shutdown system 90 which is operatively coupled to logic system 70 and to welder 10 so as to selectively shut down welder 10 according to an actual fault condition detected by logic system 70. In the illustrated embodiment, shutdown system 90, input 60, and logic system 70 together constitute shutdown apparatus that may be employed alone or in combination with the warning system aspects of the invention. In this regard, the exemplary logic system 70 also includes a second comparator 74 receiving the output of multiplexer 62 and comparing the multiplexer output to a second threshold value REF. B. In the illustrated example, this second reference REF. B has a value greater than that of the first REF. A, wherein the value of REF. B corresponds to the sensor signal value at which a corresponding actual fault condition exists. As with the pending fault reference REF. A discussed above, several actual fault reference values REF. B may be provided to the second comparator 74 using another multiplexer coupled to counter 64 (not shown), by which individual values REF. B can be provided for each of the parameters P1-Pn, allowing individually adjustable actual fault thresholds. Shutdown system 90 further includes shutdown logic circuitry 92 coupled to receive the output of second comparator 74, where shutdown logic 92 operates to shut down operation of welder 10 or one or more components or subsystems thereof, when the output of comparator 74 indicates that an actual fault condition has been detected.

Shutdown system 90 may further include a user interface or a display 94 which may be separate from warning system display 84, or a single display may be shared between signaling system 80 and shutdown system 90 so as to provide an indication that pending fault conditions and/or actual fault conditions have been detected. Furthermore, as with warning system display 84, shutdown system display 94 is coupled to receive sensor identifier information from sample/hold 68 of input 60, whereby display 94 can render information to the operator regarding the source of the actual fault condition which caused the shutdown. It is noted in FIG. 1 that the sensor identifier information from sample/hold 68 may also be provided directly to signaling device 82 and/or to shutdown logic 92, wherein the pending fault warning signals from device 82 may be provided such that an operator of welder 10 can be informed of the source of the pending fault (e.g., different warning signals corresponding to different pending fault conditions). In like fashion, shutdown logic 92 may also provide an operator signal (shutdown signal) telling the operator that an actual fault condition exists and that shutdown is being undertaken based on the sensor identifier information from input 60, whereby the operator may be able to differentiate between different shutdown and/or pending fault warning signals to immediately be aware of the source of the pending or actual fault conditions.

Figure 5:
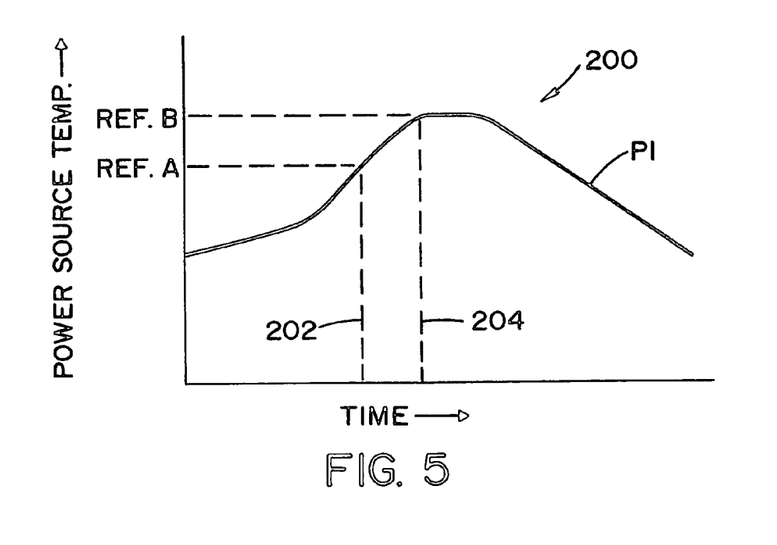
FIGS. 5-8 are graphs further illustrating operation of the exemplary warning systems in accordance with the invention.
Figure 6:
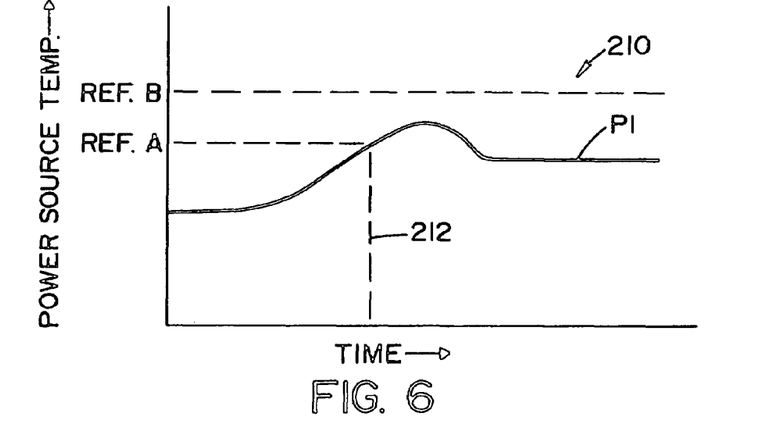

Referring also to FIGS. 5 and 6, operation of the warning system of FIG. 1 is further illustrated in several exemplary situations. FIGS. 5 and 6 respectively illustrate graphs 200 and 210 showing plots of power source temperature parameter P1 (from sensor 52 in FIG. 1), as a function of time. In the situation of FIG. 5, the pending fault threshold reference REF. A is set at a first voltage value representing a temperature below that of an actual power source fault, and the actual fault reference REF. B is set to a voltage corresponding to the value of sensor signal P1 at an actual fault temperature in power source 12. As the power source temperature signal P1 rises in FIG. 5, the value of sensor signal P1 exceeds REF. A at a time 202. As multiplexer 62 steps through the signal inputs from sensors 52-58, pending fault comparator 72 compares the corresponding sensor signals P1-Pn to REF. A. Upon selection of multiplexer channel 0 corresponding to sensor signal P1 from power source thermal sensor 52, the output of multiplexer 62 exceeds the valve of REF. A, whereby the output of first comparator 72 transitions to a pending fault warning state. At this point, signaling device 82 determines that power source sensor 52 is the sensor associated with the detected pending fault condition (based on the sensor identifier information from the output of sample/hold 68 indicating the current selection of multiplexer channel 0) and provides a corresponding pending fault warning signal to the welding operator.

In the case of FIG. 5, the welding operation is continued and the corresponding temperature of power source 12 continues to rise after the warning signal until a second time 204, at which the value of sensor signal P1 exceeds the actual fault reference threshold REF. B. This causes the output of second comparator 74 in logic system 70 to transition into an actual fault state, whereby shutdown logic 92 initiates an immediate or controlled shutdown of welder 10 and/or of power source 12, and may optionally provide an actual fault signal to the operator. As with the pending fault warning signal, the optional actual fault shutdown signal from shutdown logic 92 may include an indication to the operator of the source of the actual fault (i.e. the power source thermal sensor 52 in this example), wherein shutdown logic 92 uses sensor identifier information from sample/hold 68 to initiate a corresponding shutdown signal. In this manner, the shutdown procedure and conditions may be tailored to the particular system parameter that indicated the fault.

Another scenario is illustrated in FIG. 6 in which the sensor value P1 initially exceeds REF. A at a time 212, after which the operator discontinues operation of welder 10 and/or finishes a currently pending welding operation and thereafter discontinues welding, whereby the temperature of power source 12 does not exceed the actual fault value REF. B. As seen in FIGS. 5 and 6, therefore, the early warning system of the invention advantageously provides early detection and warnings regarding pending fault conditions in welder 10, allowing an operator thereof to actively make a decision as to whether and when to discontinue operation of welder 10. In accordance with another aspect of the invention, should the operator ignore the initial pending fault warning from signaling system 80 and/or knowingly continue operation or welder 10 following a pending fault warning signal, shutdown logic 92 in system 90 may issue stop signal to power source 12, or may initiate a controlled shutdown sequence if the measured parameter P1 eventually reaches the actual fault value REF. B. Such a controlled shutdown sequence may be specific to a given type or source of actual fault condition detected by logic system 70, wherein shutdown logic 92 employs sensor identifier information from sample/hold 68 in selecting from one of a plurality of predetermined shutdown procedures or sequences. In this manner, shutdown of welder 10 may be carried out such that a welding operation currently underway may be completed without damaging workpiece W and without confusing the operator, while still preventing or inhibiting thermal damage to power source 12.

It is noted at this point that input 60, logic system 70, pending fault signaling system 80, and shutdown system 90 may be implemented in hardware, for example electrical circuitry, or may alternatively be implemented in hardware, software firmware, programmable logic circuits, etc., and/or combinations thereof. In this regard, one possible alternative implementation could include integration of the functionality of input 60, logic 70 and/or systems 80, 90 into welder controller 18, wherein controller 18 would receive the signal inputs from the sensors 52-58 along with current and voltage feedback from shunt 20 and voltage sensor 22, respectively, with controller 18 comprising suitable signaling output apparatus for providing pending fault and/or shutdown warning signals to the system operator, whether audio, visual, tactile, digital, or otherwise, and with system interconnections to initiate system shutdown. In this regard, controlled shutdown sequences, signal content, reference values used in logic 70 for detecting pending or actual faults, and the other operational functionality of the warning system may be implemented in the controller 18 in the form of hardware, software, firmware, programmable circuits, or combinations thereof or in other single or separate devices in the system 10, such as the wire feeder microprocessor 38, etc.

Figure 2:
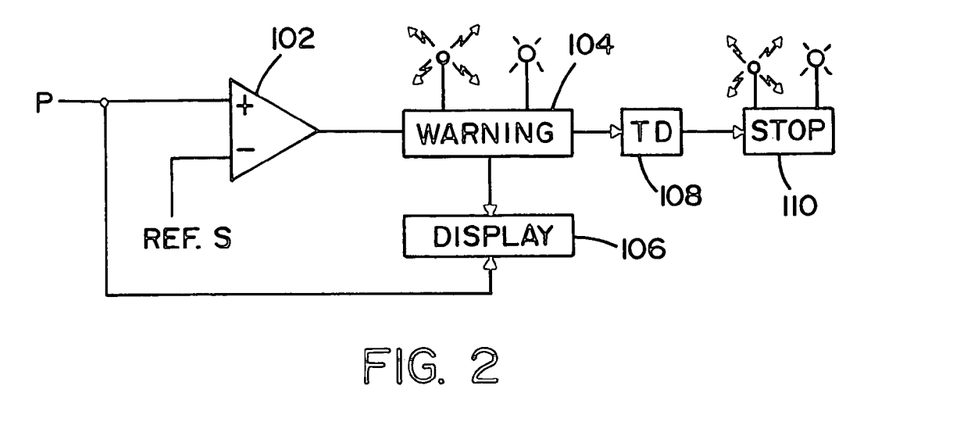
FIG. 2 is a schematic view illustrating a warning system and shutdown apparatus in accordance with the invention.

Referring now to FIG. 2, another possible implementation of a portion of the warning system and shutdown apparatus of the invention is illustrated, in which a single sensed parameter P is provided to one input of a comparator 102 and is compared with a single reference or threshold signal REF. S. For non-time critical fault conditions, a single reference REF. S may be employed, which can be set at a value corresponding to an actual fault condition, or to a lower or higher value, with a warning being provided to the system operator by a signaling device 104 (audio, visual, tactile, digital communication signals, etc.), wherein the value of the sensed parameter and/or indication of the pending fault thereof may be rendered to the operator via a display 106. In this implementation, once the sensed parameter exceeds the value of REF. S, and the warning signal has been issued by device 104, a time delay 108 is provided between the warning from signaling device 104 and a stop or shutdown action/signal by shutdown logic 110. In this manner, the shutdown will proceed a predetermined time period after fault detection. As with the above implementation of FIG. 1, the comparison of the sensed parameter P with the reference REF. S, the provision of and the content of a warning signal by signaling device 104, the rendering thereof by display 106, the provision of the time delay 108, and/or the stoppage or controlled shutdown via shutdown logic 110 may be alternatively provided in hardware, software, firmware, programmable logic, or combinations thereof. Furthermore, the approach of FIG. 2 may be implemented for a plurality of system sensed parameters, with individually corresponding comparator circuits and individually adjustable reference values REF. S and time delays 108.

Figure 3:
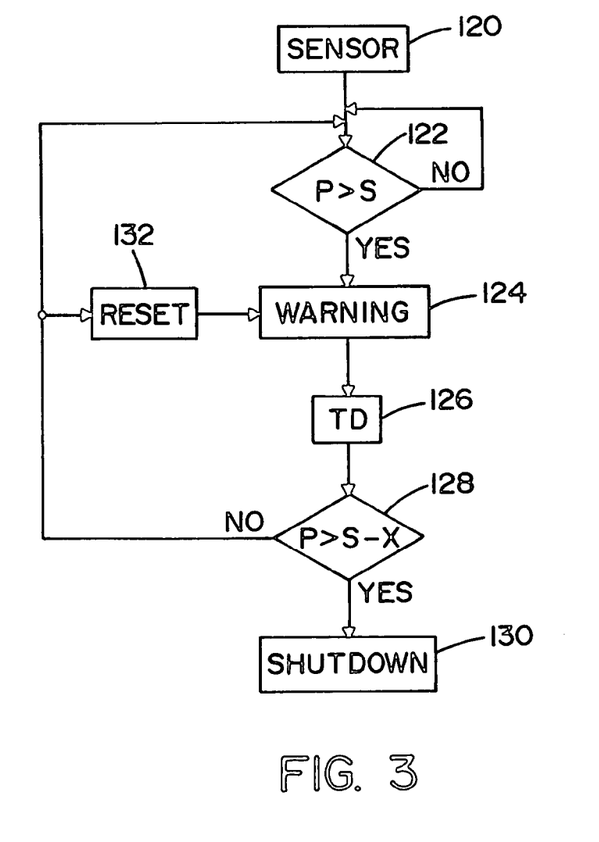
FIG. 3 is a flow diagram illustrating one implementation of the operation of a warning system of the invention.

Referring to FIG. 3, one possible logical implementation of the warning/shutdown system of FIG. 2 includes sensing the operational condition of an arc processing system at 120, followed by comparing the corresponding sensor parameter P with a single reference value S (REF. S in FIG. 2 above) at 122. If the parameter P is greater than the value S at 122, a warning is issued at 124 (e.g., by signaling device 104 in FIG. 2). Otherwise, the sensor value P is again compared with S at 122. Once a fault has been detected and a warning signal has been provided at 124, a time delay period begins at 126 (e.g., a timer circuit is started or a software timer is activated, etc.), after which the sensed parameter value P is compared to a second lower value (S–X) at 128. If parameter P is greater than S–X at 128, a system shutdown operation is undertaken at 130, whether immediate system stoppage or a controlled shutdown sequence. However, if P is less than the quantity S–X at 128, the warning is reset at 132 and the system returns to 122 to again monitor the sensor value P with respect to the threshold value S.

In this manner, the operator is notified at 124 that a pending fault condition has been detected, and the system will be shut down in a controlled fashion at 130 a predetermined time value thereafter unless it is determined at 128 that the sensed parameter P has returned to an acceptable operational range (e.g., more than the value X below the threshold value S). This implementation of the invention advantageously allows the operator to choose after the warning 124 to manually discontinue operation of system 10, or to finish a currently pending operation and then manually shut the system down. This latter choice may allow the monitored system component or subsystem (e.g., power source 12 of welder 10) to return to acceptable operating conditions without undesirable fault conditions occurring, and without undesirable automatic system shutdown. This may provide safe operation similar to that illustrated in FIG. 6 above with the comparison value S being set to REF. A in the graph 210, wherein the system operator can make proactive decisions regarding the manner and timing of the system shutdown. This feature is also facilitated by providing the operator with different warnings for different fault conditions, whereby the operator may determine what to do, based at least partially upon which component or subsystem sensor has reached the threshold value REF. S. At the same time, the system of the invention insures that absent operator intervention or action, automatic shutdown will be provided to prevent system component damage while advantageously providing for controlled shutdown sequence to mitigate workpiece or system damage.

Figure 4:
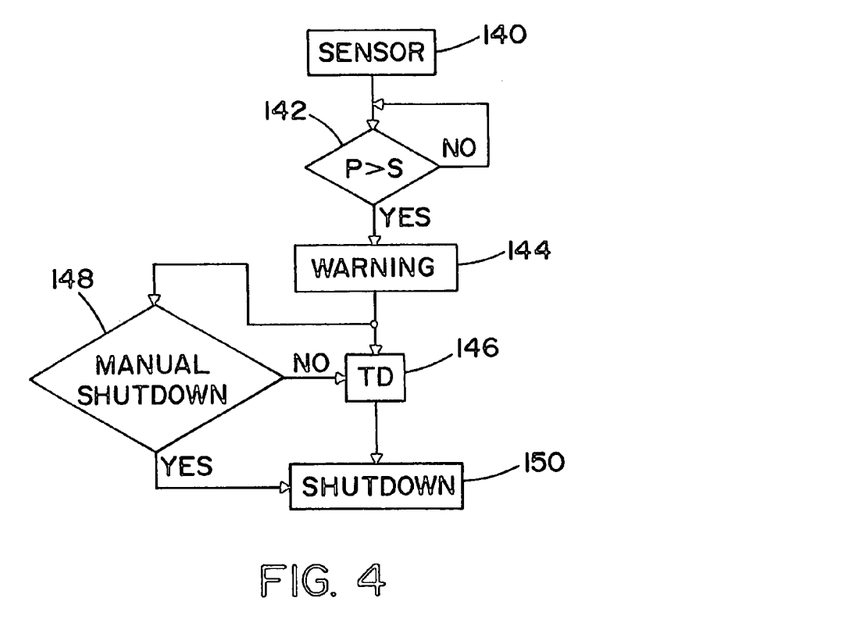
FIG. 4 is a flow diagram illustrating another exemplary operational implementation of the warning system according to the invention.

Referring now to FIG. 4, another possible implementation involves receiving the sensor signal at 140, and comparing the sensed value P with a threshold or reference value S at 142. If P exceeds S at 142, a warning signal is provided to the operator of the system at 144. Otherwise, the parameter P is again monitored and compared to the value S at 142. Upon detection of a fault condition at 142 and issuance of the warning signal at 144, a time delay begins at 146, and the warning system monitors indications of manual shutdown at 148 during the predetermined delay time period, thereby allowing an operator to manually initiate system shutdown (controlled or immediate) before expiration of the delay timer. Once the time delay has elapsed at 146 or a manual shutdown has been initiated at 148, the system provides for shutdown at 150, which may be an immediate shutdown of system components or a controlled shutdown sequence. In these examples it is noted that the value of the reference signal REF. S can be alternatively set to correspond to an actual fault condition, a pending fault condition, or other relevant values, wherein the corresponding warning signal (if any) provided upon the sensed value P exceeding the reference REF. S can be described as a fault warning, a pending fault warning, an actual fault warning, etc.

Figure 7:
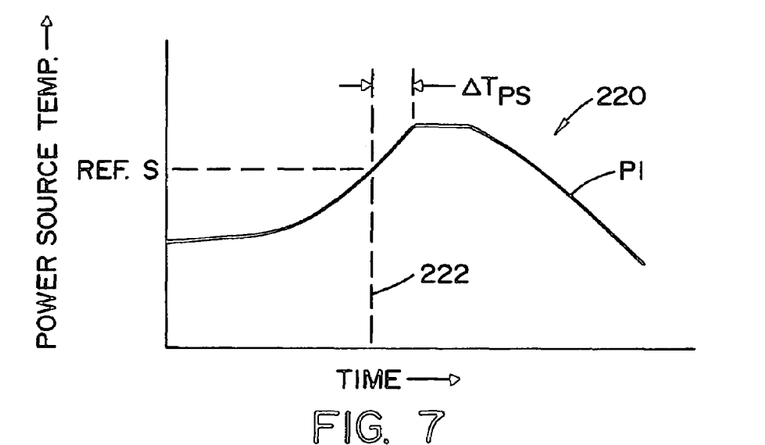
Figure 8:
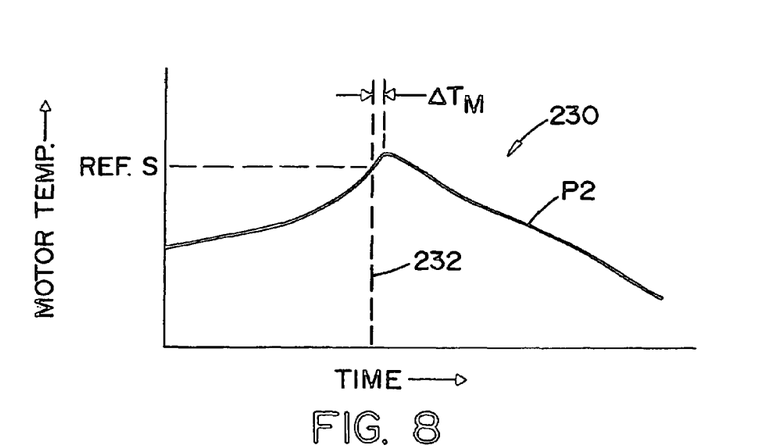

Referring also to FIGS. 7 and 8, another possible implementation of the system of FIG. 2 can be provided with multiple inputs (for sensing multiple system operational parameters), for example, using multiplexers or other multiple input comparison means, wherein the type and content of pending fault warnings or shutdown warnings or fault warnings generally, as well as the predetermined time delay period between a warning and an automatic shutdown, may be different for different sensed operational conditions. As stated above, one possible approach is to provide multiple comparators 102 as in FIG. 2, with each comparator receiving a dedicated sensor input P and having a corresponding reference value S. For instance, each such circuit may include a dedicated time delay 108, whereby different sensed conditions can be compared with different reference threshold values S, and different delay time values can be provided between a pending fault warning and system shutdown, depending on the source of a detected fault condition. Alternatively, a multiplexer could be used with corresponding multiplexer channel selection information (e.g., sensor identifier information) being provided to the warning and/or shutdown apparatus for selection of a corresponding time delay, signal, shutdown sequence, etc.

FIG. 7 illustrates a graph 220 showing power source temperature parameter P1 as a function of time, wherein the value of P1 is compared with a single reference REF. S, as in the implementation of FIG. 2. As shown in FIG. 7, P1 exceeds REF. S at a time 222, whereat a pending fault warning is issued (104 in FIG. 2). A time delay begins at time 222, illustrated as $\Delta T_{PS}$ in FIG. 7, whereupon system shutdown is initiated a predetermined delay time period $\Delta T_{PS}$ after the warning time 222, and the power source temperature P1 thereafter stops rising and eventually recedes. FIG. 8 illustrates use of the same or similar system in association with controlling or monitoring wire feeder motor temperature as a function of time. In the graph 230 of FIG. 8, the motor temperature parameter P2 is illustrated as a function of time, wherein P2 is compared with a reference REF. S. As P2 exceeds REF. S, a shorter delay time begins at time 232, whereby system shutdown is initiated a short time $\Delta T_M$ after the fault detection time 232, to prevent motor failure.

Figure 9:
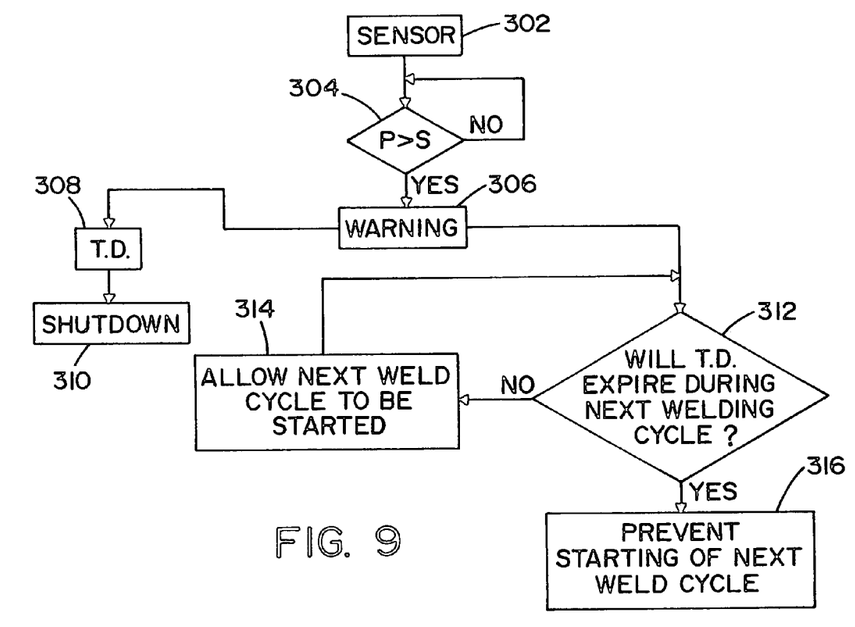
FIG. 9 is a flow diagram illustrating an operational implementation of an exemplary shutdown apparatus in accordance with an aspect of the invention.
Figure 10:
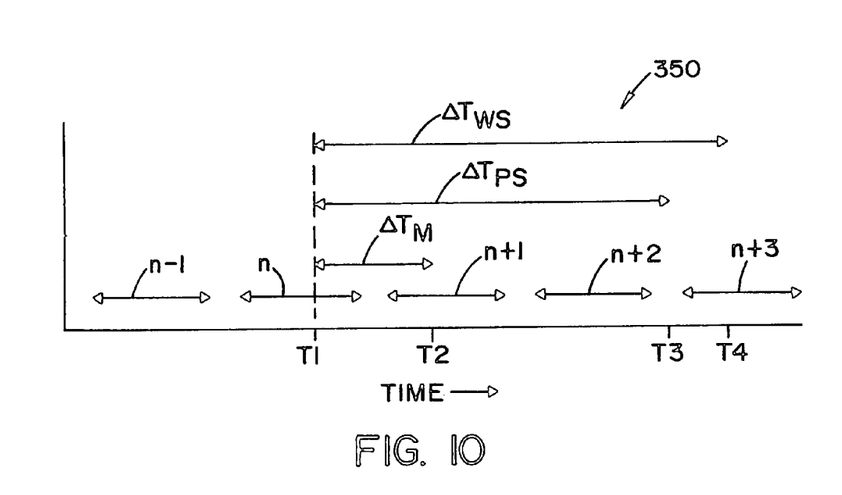
FIG. 10 is a graph further illustrating operation of the exemplary shutdown apparatus in accordance with the invention.

Referring now to FIGS. 2, 9, and 10, another aspect of the invention relates to techniques and apparatus for shutting down an arc processing system based on detection of actual and/or pending fault conditions, wherein the shutdown aspects of the invention may be carried out alone or in combination with the above described pending fault warning features and systems. In the implementation of FIG. 2, for example, shutdown logic 110 may be operated with or without provision of operator warnings by signaling device 104, which can be omitted in certain implementations of the shutdown aspects of the invention. In this example, shutdown logic 110 is operatively coupled to the detection logic (e.g., comparator 102) and to the arc processing system and operates to selectively perform system shutdown a predetermined time period T.D. 108 after fault detection (e.g., after the monitored sensor signal P exceeds the reference REF. S). In addition, the amount of delay time may be different for different detected fault conditions, as shown in FIG. 10.

In the illustrated embodiment, moreover, the shutdown system or logic 110 is operable to selectively allow or prevent starting of a new welding cycle after fault detection, based upon whether the predetermined time delay T.D. 108 will expire during such a prospective new welding cycle (e.g., based on whether the prospective new cycle is expected to complete before the shutdown begins). This feature is particularly advantageous where a welder is performing a series or sequence of repetitive welds of generally predictable or known duration, as illustrated in a graph 350 of FIG. 10. In this case, the exemplary welder 10 is configured to perform a sequence of welding operations or welding cycles indicated as n−1, n, n+1, n+2, n+3 in FIG. 10, wherein each of the cycles is generally the same length of time with a given off time between successive welding cycles. For purposes of illustration, it is assumed that a pending or actual fault condition is detected at a time T1 in the graph 350 of FIG. 10 during performance of welding cycle n, and that the shutdown system 110 shuts the welder 10 down when the time delay 108 (FIG. 2) expires. Furthermore, it is noted that for multiple sensor implementations (e.g., FIG. 1 above), different time delay values may be employed by the shutdown apparatus of the invention to selectively shut the system 10 down a predetermined time period after fault detection, where the time period may be different for different types or sources of fault conditions in the welder 10. In this regard, FIG. 10 illustrates several exemplary time delay values $\Delta T_M$, $\Delta T_{PS}$ and $\Delta T_{WS}$ corresponding to predetermined time periods selected for fault conditions sensed in the wire feeder motor 36 (motor over-temperature condition), the welder power source 12 (power source over-temperature condition), and welding wire supply level 40 (low wire supply condition), respectively.

As shown in FIG. 9, the sensor input signal parameter (e.g., signal P in one example) is received at 302 and the value thereof is scrutinized at 304 to determine whether the parameter P is greater than the reference value REF. S. If not, the parameter P is again checked at 304. Once P exceeds S at 304, a fault condition is determined to exist in the welder 10 and a warning may optionally be issued at 306. A time delay is started at 308 upon fault detection, and a system shutdown operation is undertaken at 310, which can be an immediate system stoppage or a controlled shutdown sequence, wherein the mode and manner of system shutdown may be selected according to the system operational condition associated with the detected fault condition.

In accordance with an aspect of the invention, the shutdown apparatus makes a determination at 312 upon fault detection as to whether the predetermined time delay will expire during a next welding cycle in the sequence. In the illustrated case, a fault is detected at time T1 during a current welding cycle n, where the normal progression of the sequence would be to begin the next cycle n+1 when turned on after completion of cycle n. However, if the detected fault corresponds to a motor over-temperature fault (pending or actual), the shutdown system 110 will initiate the shutdown (e.g., at 310 in FIG. 9) a relatively short predetermined time period $\Delta T_M$ later at time T2, as shown in FIG. 10. In this example, the predetermined time period $\Delta T_M$ is such that the shutdown system 110 determines at 312 that the time delay $\Delta T_M$ will expire during the prospective next welding cycle n+1, and accordingly prevents starting of the next cycle n+1 (e.g., and subsequent sequential weld cycles n+2, n+3, etc.) at 316 in FIG. 9. In this manner, the invention prevents or reduces the likelihood of a shutdown during actual welding operation, thereby preventing unnecessary workpiece damage from unfinished welding cycles. In this regard, it is noted that this aspect of the invention is applicable to manually operated welders as well as automated systems, wherein the shutdown apparatus ensures that shutdown occurs between successive welding cycles to prevent workpiece scrap and rework, regardless of whether an operator is warned upon fault detection.

FIG. 10 also illustrates other possible scenarios for different faults detected at time T1. For a power source fault, a somewhat longer predetermined time period $\Delta T_{PS}$ is employed by the delay 108, whereby the welder 10 is shut down at a later time T3. In this case, the time T3 falls after prospective welding cycles n+1 and n+2 can be completed, wherein the shutdown apparatus determines at 312 in FIG. 9 (e.g., when the welder 10 is again attempted to be started for the next cycle) that the appropriate time delay $\Delta T_{PS}$ will not expire during the next prospective welding cycle n+1 (NO at 312). Accordingly, the apparatus allows the next weld cycle n+1 to be started at 314, and returns to 312 to make a similar determination regarding the cycle n+2. In this example, the apparatus determines at 312 that this next cycle n+2 can also be safely completed, and accordingly allows cycle n+2 to be started at 314. As shown in FIG. 10, the predetermined delay time $\Delta T_{PS}$ eventually elapses and the welder 10 is shut down at time T3 prior to the scheduled start of the cycle n+3, wherein the shutdown apparatus of the invention allows the cycles n, n+1, and n+2 to be completed without damaging or degrading the workpiece, while still preventing or inhibiting catastrophic failure of power source 12.

Another possible situation is shown in FIG. 10 for the case of a detected shortage of consumable welding wire from the wire feeder supply 40. Assuming again that a fault is detected at time T1 in FIG. 10 (in this case the amount of welding wire 32 falling below a predetermined threshold amount as indicated by the parameter P3 exceeding the corresponding reference value REF. S), the time delay 108 employs a corresponding predetermined time period $\Delta T_{WS}$ after which the welder 10 will be shut down at a time T4, and determines at 312 that the next welding cycle n+1 can be started at 314. The same is true of the subsequent cycle n+2, which is likewise allowed to begin at 314. However, the shutdown apparatus then determines at 312 that the welding cycle n+3 cannot be completed before time T4, and at 316 prevents cycle n+3 from starting. In this manner, the exemplary shutdown apparatus automatically determines if a new welding cycle will complete before the predetermined time period will expire, and selectively prevents new welding cycles from starting if the predetermined time period will expire before the new welding cycle will complete, thereby effectively reducing or eliminating unnecessary scrap and rework while allowing safe completion of an appropriate amount of arc processing system operation before shutting down to prevent system damage.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A warning system for providing advance warnings to an operator of an arc processing system, said warning system comprising:
   an input operatively coupled with a sensor associated with said arc processing system to receive a sensor signal indicative of an operational condition of said arc processing system;
   a logic system operatively coupled with said input, said logic system being operable to detect a pending fault condition according to said sensor signal;
   a pending fault signaling system operatively coupled with said logic system to selectively provide a warning signal to an operator of said arc processing system, said warning signal being indicative of said pending fault condition; and
   a shutdown system operatively coupled to said pending fault signaling system and to said arc processing system, said shutdown system being operable to selectively shut down said arc processing system according to a controlled shutdown sequence,
   said shutdown system is operable to selectively shut down said arc processing system a predetermined time period after said pending fault signaling system provides said warning signal to said operator, and said shutdown system is operable to selectively allow a new welding cycle to start after detection of said pending fault condition if said new welding cycle will complete before said predetermined time period will expire, and to selectively prevent said new welding cycle from starting if said predetermined time period will expire before said new welding cycle will complete.

2. A warning system as defined in claim 1, wherein said warning signal is one of an audio signal, a visual signal, a tactile signal, and a digital communication signal.

3. A warning system as defined in claim 1, wherein said shutdown system is operable to selectively shut down said arc processing system according to said controlled shutdown sequence in response to said pending fault condition.

4. A warning system as defined in claim 1, wherein said shutdown system is operable to selectively shut down said arc processing system said predetermined time period after said pending fault signaling system provides said warning signal to said operator unless said operator manually shuts down said arc processing system.

5. A warning system as defined in claim 1, wherein said logic system is further operable to detect an actual fault condition according to said sensor signal, and said shutdown system is operable to selectively shut down said arc processing system according to said controlled shutdown sequence in response to said actual fault condition.

6. A warning system as defined in claim 5, wherein said shutdown system provides a shutdown signal to said operator, said shutdown signal being indicative of said actual fault condition.

7. A warning system as defined in claim 1, wherein said shutdown system provides a shutdown signal to said operator upon shutting down said arc processing system, said shutdown signal being indicative of said pending fault condition.

8. A warning system as defined in claim 7, wherein said shutdown signal is one of an audio signal, a visual signal, a tactile signal, and a digital communication signal.

9. A warning system as defined in claim 1, wherein said input is operatively coupled with a plurality of sensors associated with said arc processing system to receive a corresponding plurality of sensor signals indicative of a plurality of operational conditions of said arc processing system, and wherein said logic system is operable to detect said pending fault condition according to at least one of said sensor signals.

10. A warning system as defined in claim 9, wherein said warning signal is one of an audio signal, a visual signal, a tactile signal, and a digital communication signal.

11. A warning system as defined in claim 9, wherein said shutdown system is operable to selectively shut down said arc processing system according to said controlled shutdown sequence in response to said pending fault condition.

12. A warning system as defined in claim 9, wherein said shutdown system is operable to selectively shut down said arc processing system said predetermined time period after said pending fault signaling system provides said warning signal to said operator unless said operator manually shuts down said arc processing system.

13. A warning system as defined in claim 9, wherein said shutdown system provides a shutdown signal to said operator upon shutting down said arc processing system, said shutdown signal being indicative of said pending fault condition.

14. A warning system as defined in claim 13, wherein said shutdown signal is one of an audio signal, a visual signal, a tactile signal, and a digital communication signal.

15. A warning system as defined in claim 9, wherein said logic system is further operable to detect an actual fault condition according to at least one of said sensor signals, and said shutdown system is operable to selectively shut down said arc processing system according to said controlled shutdown sequence in response to said actual fault condition.

16. A warning system as defined in claim 15, wherein said input is operatively coupled with said shutdown system, wherein said input provides a sensor identifier to said shutdown system indicating a particular one of said sensors associated with said actual fault condition, and wherein said shutdown system provides one of a plurality of shutdown signals to said operator according to said sensor identifier to indicate a particular actual fault condition corresponding to said particular one of said sensors.

17. A warning system as defined in claim 15, wherein said shutdown signal is one of an audio signal, a visual signal, a tactile signal, and a digital communication signal.

18. A warning system as defined in claim 15, wherein said logic system compares said sensor signal to a first reference to detect said pending fault condition and compares said sensor signal to a second reference to detect said actual fault condition.

19. A warning system as defined in claim 15, wherein said shutdown system provides a shutdown signal to said operator, said shutdown signal being indicative of said actual fault condition.

20. A warning system as defined in claim 19, wherein said shutdown signal is one of an audio signal, a visual signal, a tactile signal, and a digital communication signal.

21. A warning system as defined in claim 9, wherein said input is operatively coupled with said pending fault signaling system, wherein said input provides a sensor identifier to said pending fault signaling system indicating a particular one of said sensors associated with said pending fault condition, and wherein said pending fault signaling system provides one of a plurality of warning signals to said operator according to said sensor identifier to indicate a particular pending fault condition corresponding to said particular one of said sensors.

22. A warning system as defined in claim 21, wherein said warning signal is one of an audio signal, a visual signal, a tactile signal, and a digital communication signal.

23. A warning system as defined in claim 21, wherein said shutdown system is operable to selectively shut down said arc processing system according to said controlled shutdown sequence in response to said pending fault condition.

24. A warning system as defined in claim 21, wherein said predetermined time period is dependent on said particular pending fault condition corresponding to said particular one of said sensors.

25. A warning system as defined in claim 21, wherein said shutdown system is operable to selectively shut down said arc processing system said predetermined time period after said pending fault signaling system provides said warning signal to said operator unless said operator manually shuts down said arc processing system.

26. A warning system as defined in claim 21, wherein said shutdown system provides a shutdown signal to said operator upon shutting down said arc processing system, said shutdown signal being indicative of said pending fault condition.

27. A warning system as defined in claim 26, wherein said shutdown signal is one of an audio signal, a visual signal, a tactile signal, and a digital communication signal.

28. A warning system as defined in claim 21, wherein said logic system is further operable to detect an actual fault condition according to at least one of said sensor signals, and said shutdown system is operable to selectively shut down said arc processing system according to said controlled shutdown sequence in response to said actual fault condition.

29. A warning system as defined in claim 28, wherein said shutdown signal is one of an audio signal, a visual signal, a tactile signal, and a digital communication signal.

30. A warning system as defined in claim 28, wherein said logic system compares said sensor signal to a first reference to detect said pending fault condition and compares said sensor signal to a second reference to detect said actual fault condition.

31. A warning system as defined in claim 28, wherein said shutdown system provides a shutdown signal to said operator, said shutdown signal being indicative of said actual fault condition.

32. A warning system as defined in claim 31, wherein said shutdown signal is one of an audio signal, a visual signal, a tactile signal, and a digital communication signal.

33. A warning system as defined in claim 28, wherein said input is operatively coupled with said shutdown system, wherein said input provides a sensor identifier to said shutdown system indicating a particular one of said sensors associated with said actual fault condition, and wherein said shutdown system provides one of a plurality of shutdown signals to said operator according to said sensor identifier to indicate a particular actual fault condition corresponding to said particular one of said sensors.

34. A warning system as defined in claim 33, wherein said shutdown system selectively shuts down said arc processing system according to said controlled shutdown sequence corresponding to said particular actual fault condition according to said sensor identifier.

35. A method of indicating a pending fault condition to an operator of an arc processing system, said method comprising:

monitoring a sensor signal indicative of an operational condition of said arc processing system;

detecting a pending fault condition according to said sensor signal;

providing a warning signal to said operator, said warning signal being indicative of said pending fault condition; and selectively shutting down said arc processing system according to a controlled shutdown sequence, said selectively shutting down said arc processing system begins at a predetermined time period after said warning signal is provided to said operator, and said selectively shutting down said arc processing system comprises selectively allowing a new welding cycle to start after detection of said pending fault condition if said new welding cycle will complete before said predetermined time period will expire, and selectively preventing said new welding cycle from starting if said predetermined time period will expire before said new welding cycle will complete.

36. A method as defined in claim 35, further comprising selectively shutting down said arc processing system according to said controlled shutdown sequence in response to said pending fault condition.

37. A method as defined in claim 35, wherein said selectively shutting down said arc processing occurs after completion of a current welding cycle.

38. A method as defined in claim 35, further comprising detecting an actual fault condition according to said sensor signal, and selectively shutting down said arc processing system according to said controlled shutdown sequence in response to said actual fault condition.

39. A method as defined in claim 38, wherein said selectively shutting down said arc processing system occurs after completion of a current welding cycle.

40. A method as defined in claim 35, wherein said warning signal is indicative of a particular pending fault condition.

41. A method as defined in claim 40, further comprising detecting an actual fault condition according to said sensor signal, and selectively shutting down said arc processing system according to said controlled shutdown sequence in response to said actual fault condition.

42. A method as defined in claim 41, wherein said selectively shutting down said arc processing system in response to said actual fault condition begins at a predetermined time period after detecting said actual fault condition.

* * * * *